(12) United States Patent
Eberlc et al.

(10) Patent No.: US 6,422,381 B1
(45) Date of Patent: Jul. 23, 2002

(54) BELT CONVEYOR WITH INCREASED CAPACITY

(75) Inventors: Marc Eberlc, Balgonie; Mat Green, Swift Current, both of (CA)

(73) Assignee: Brandt Industries, Inc., Regina (CA)

( * ) Notice: Subject to any disclaimer, the term of this patent is extended or adjusted under 35 U.S.C. 154(b) by 0 days.

(21) Appl. No.: 09/879,526

(22) Filed: Jun. 12, 2001

(30) Foreign Application Priority Data

Sep. 20, 2000 (CA) .............................................. 2320614

(51) Int. Cl.[7] .............................................. B65G 21/20
(52) U.S. Cl. ................................ 198/836.1; 198/836.3; 198/821
(58) Field of Search ................................ 198/819, 821, 198/837, 840, 841, 836.1, 836.3

(56) References Cited

U.S. PATENT DOCUMENTS

| | | | | |
|---|---|---|---|---|
| 5,267,642 A | * | 12/1993 | Gharpurey et al. | .. 198/836.3 X |
| 5,303,813 A | * | 4/1994 | de Rooy | ............... 198/836.1 X |
| 5,458,230 A | * | 10/1995 | Balcar | ................. 198/836.1 X |
| 5,913,404 A | * | 6/1999 | Bowman | ................. 198/836.1 |
| 6,293,389 B1 | * | 9/2001 | Knapp et al. | ......... 198/836.1 X |

* cited by examiner

*Primary Examiner*—James R. Bidwell
(74) *Attorney, Agent, or Firm*—Frost Brown Todd LLC

(57) ABSTRACT

A belt conveyor for conveying granular material comprises a tube and a hopper. Guide members guide the belt from a flat orientation as the belt leaves the lower roller into a cupped orientation as the belt enters the hopper. The cupped orientation is maintained by sliding contact at an interface between the lower surface of the belt and the hopper walls as the belt passes through the hopper. Left and right baffle members are attached along the hopper side walls and thereby prevent the granular material from sliding down the hopper walls into contact with the interface between the lower surface of the belt and the hopper walls. The belt has a width that is substantially fully exposed to granular material entering the hopper. A method of increasing the capacity of a belt conveyor comprises reducing the width of the flashing covering belt side portions.

7 Claims, 6 Drawing Sheets

BELT CONVEYOR WITH INCREASED CAPACITY

This invention is in the field of belt conveyors and in particular such conveyors for conveying granular material such as grain.

BACKGROUND OF THE INVENTION

Belt conveyors are commonly used for conveying granular particulate material such as grain, fertilizer, salt and the like from a transport vehicle up and into a storage facility. Commonly there is a hopper at the lower end of the belt conveyor to receive the granular material and direct it onto the belt, which then passes through a tube. The belt makes a transition from a flat orientation coming off the lower roller to a cupped orientation for passage through the tube. The transition can take place between the lower roller and the hopper, in the hopper, or partly in both areas.

Conventionally these belt conveyors include a flashing covering the edges of the belt to substantially prevent the granular material from passing under the belt where same can cause increased friction between the belt and the conveyor parts against which it slides. Such material can build up under the belt and damage it as well. Typically this flashing is only required in the hopper, where the level of granular material often rises above the edges of the belt. Once the belt enters the tube, the granular material is at a level below the edges of the belt and there is little chance of same spilling over the edges.

Belt conveyors have an advantage over the common alternative auger conveyor in that the belt conveyor does not damage certain susceptible material such as peas, lentils and the like. Belt conveyors however have reduced capacity, compared to a similar size auger conveyor. U.S. Pat. No. 5,735,386 to Epp et al. is directed to increasing the capacity of a belt conveyor for granular material by mounting an auger in the hopper to help feed material into the tube.

SUMMARY OF THE INVENTION

It is the object of the present invention to provide a belt conveyor for receiving and conveying granular material that has increased capacity over conventional belt conveyors.

It is a further object of the invention to provide such a belt conveyor that is simple and inexpensive to manufacture.

It is a further object of the invention to provide a method of increasing the capacity of those belt conveyors for granular material of the type where the belt is in a cupped orientation while passing through the conveyor hopper.

The invention provides, in one aspect, a belt conveyor for conveying granular material comprising a tube having an upper output end and a lower input end. A hopper for receiving granular material is attached at the input end of the tube, the hopper including a hopper end wall and hopper side walls extending from the end wall to the input end of the tube.

A belt having an upper surface and a lower surface, has an upper path extending from a lower roller, then through a bottom of the hopper, then through the tube to an upper roller and a lower path from the upper roller to the lower roller. A drive moves the belt along the upper path from the input end toward the output end of the tube. Guide members at a lower end of the conveyor guide the belt from a flat orientation as the belt leaves the lower roller into a cupped orientation as the belt enters the hopper. The cupped orientation is maintained by sliding contact at an interface between the lower surface of the belt and the hopper walls as the belt passes through the hopper. Left and right baffle members are attached along the hopper side walls from the end wall substantially to the tube in proximity to left and right edges of the belt. The baffle members extend from the hopper wall approximately to the upper surface of the belt and thereby prevent the granular material from sliding down the hopper walls into contact with the interface between the lower surface of the belt and the hopper walls. The belt has a width that is substantially fully exposed to granular material entering the hopper.

As the belt is cupped while passing through the hopper the edges are oriented upward and the baffle in proximity to the edges prevents granular material from sliding down the hopper wall into contact with the interface where the lower surface of the belt slides against the hopper wall. The granular material sliding down the wall appears to apply enough pressure to the flexible belt edge to cause particles of granular material to work their way under the belt in large enough numbers to cause increased friction and eventual damage to the belt.

The baffle members should be close to the belt edges, however it is not critical that they be so close as to prevent any contact between the interface and granular material. The gap between the baffle member and the edge of the belt can be such that some particles can enter the gap and come into contact with the interface. It is only necessary to prevent direct downward pressure on the interface, such as when granular material piles up over the interface. The baffle member extends from the hopper wall and prevents this pressure from being exerted. The full width of the belt is left exposed, increasing the capacity of the belt conveyor substantially.

The hopper side walls could guide the belt from a first cupped orientation at the hopper end wall to a second cupped orientation at the tube, the belt having the left and right edges thereof closer to each other in the second cupped orientation than in the first cupped orientation. In this manner the cupping of the belt to conform to the tube is accomplished in two stages. First, a relatively abrupt change is made between the lower roller and the end wall, prior to the belt entering the hopper. This change to the first cupped orientation puts the edges of the belt in an upward orientation and allows the baffle members to prevent the granular material in the hopper from contacting the interface where the lower surface of the belt contacts the hopper walls. The change from the first to the second cupped orientation is accomplished by slightly angling the hopper walls. This two stage transition requires a lesser distance between the lower roller and the end wall of the hopper, as a portion of the transition takes place in the hopper. Moving the lower roller closer to the end wall of the hopper reduces interference with trucks and the like dumping into the hopper.

The invention provides, in a second aspect, a method of increasing the capacity of a belt conveyor of the type having a cupped belt running through a hopper with a width of flashing extending from hopper walls over a portion of each side of the belt to prevent granular material from moving under the belt, the method comprising reducing the width of the flashing such that a greater width of the belt is exposed to granular material entering the hopper.

Tests were conducted by the inventors on a belt conveyor operated at an angle of 30 degrees. The belt conveyor had a 1 inch belt and a 10 inch tube, and a conventional flashing covering two inches on each side of the belt. Reducing the flashing coverage to one inch on each side of the belt increased capacity by 30%, while reducing the flashing coverage to zero on each side of the belt increased capacity by 60% over the two inch coverage.

It is apparent that the amount of moving belt exposed to the granular material during loading of the belt for passage up through the tube has a hitherto unrealized significant effect on the capacity of the belt conveyor.

DESCRIPTION OF THE DRAWINGS while the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
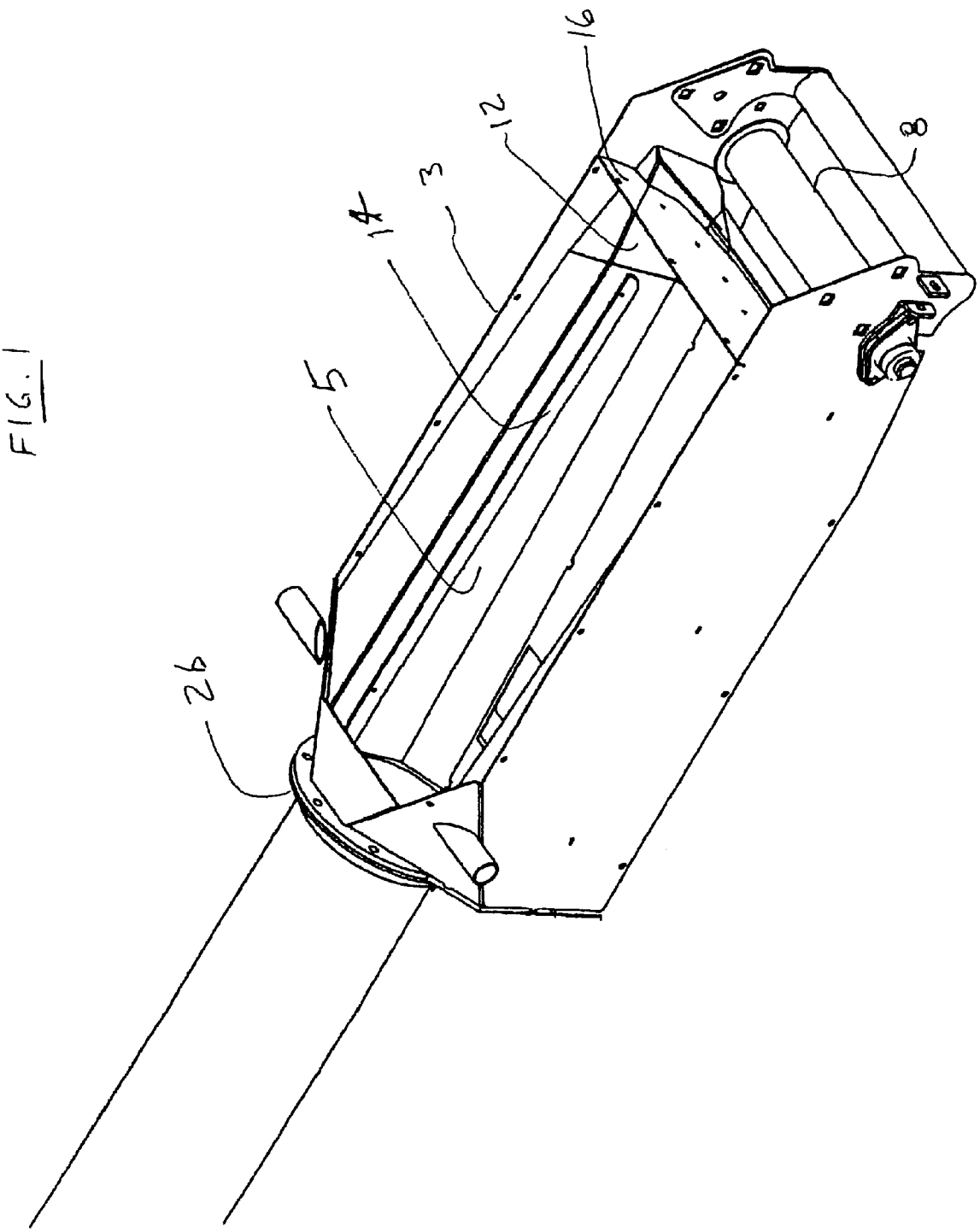
FIG. 1 is a perspective view of a hopper and tube input end of a belt conveyor of the invention with the belt and hopper end wall removed.

FIGS. 1–7 illustrate a belt conveyor 1 for conveying granular material. A tube 2 has an upper output end 2a and a lower input end 2b. A hopper 3 for receiving granular material is attached at the input end 2b of the tube 2. The hopper 3 includes a hopper end wall 4 and hopper side walls 5 extending from the end wall 4 to the input end 2b of the tube 2. A hopper extension is conventionally attached to the top of the hopper 3, but has been removed for clarity and is not illustrated.

Figure 2:
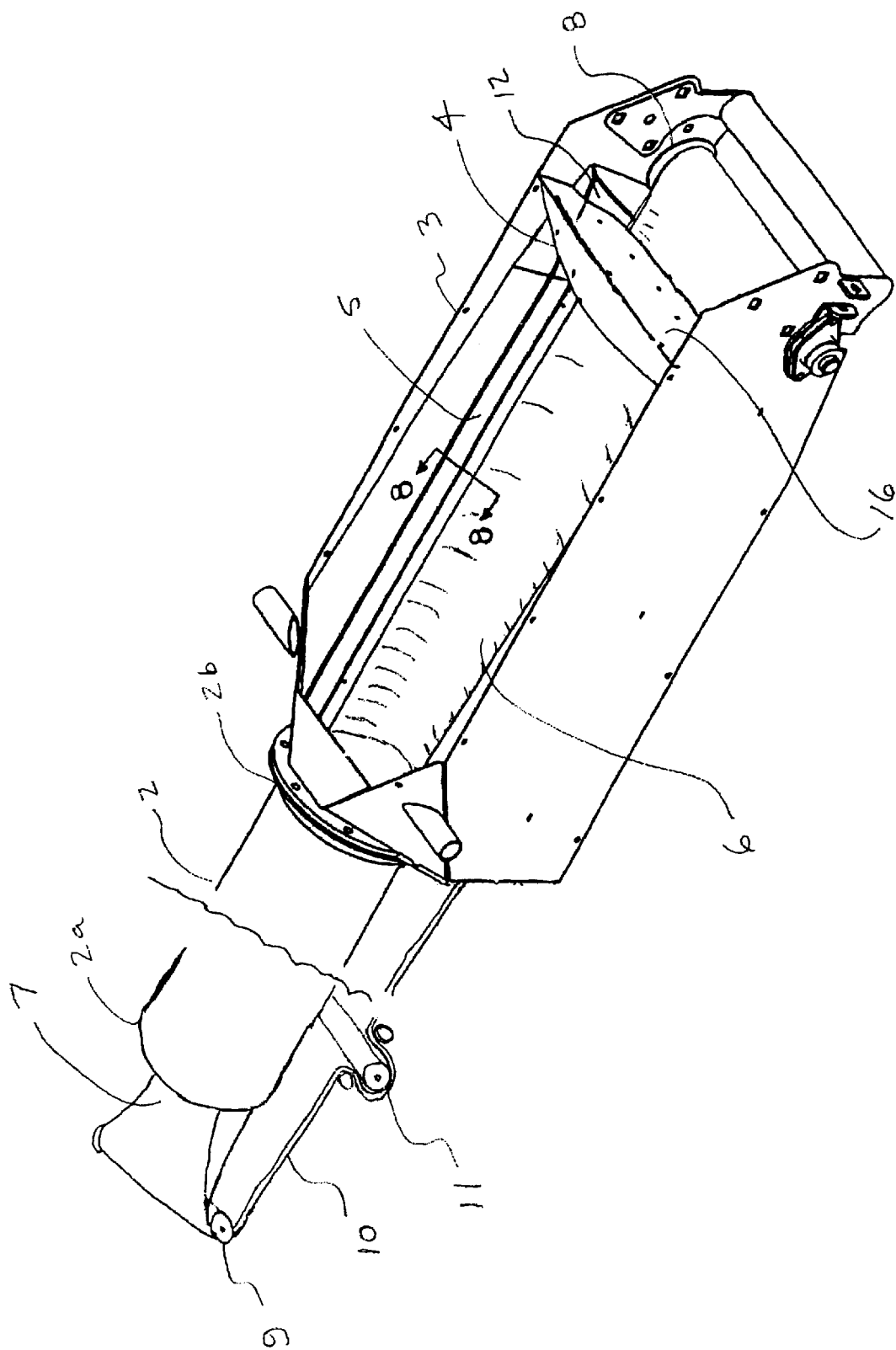
FIG. 2 is a perspective view of the belt conveyor of FIG. 1 with the belt and hopper end wall in place, and also illustrating the upper output end and drive of the conveyor.

FIG. 1 illustrates the lower input end 2b and hopper 3 with the belt 6 and end wall 4 removed, while FIG. 2 illustrates them with the belt 6 in place.

The end wall 4 is a flexible sheet that seals the lower end of the hopper 3 to prevent the escape of granular material 15. It is attached to the hopper walls 5 or guide members 12, and the end wall support bracket 16 which is welded in place as shown.

Figure 3:
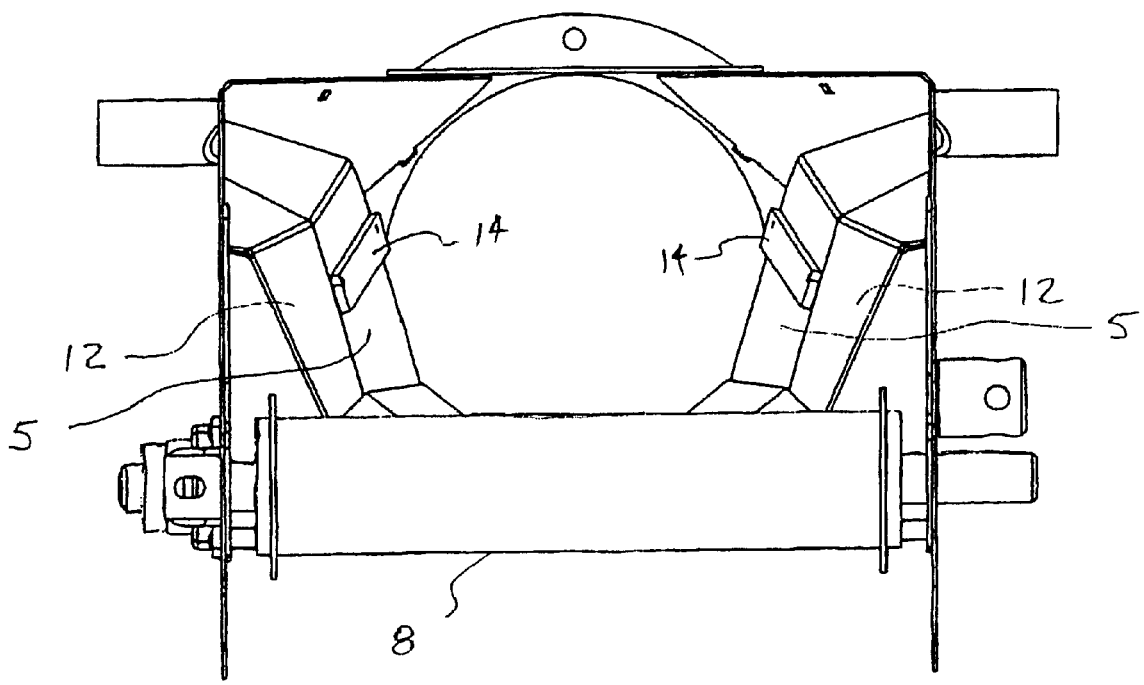
FIG. 3 is an end view of the belt conveyor of FIG. 1 with the belt, hopper end wall and end wall support bracket removed.
Figure 4:
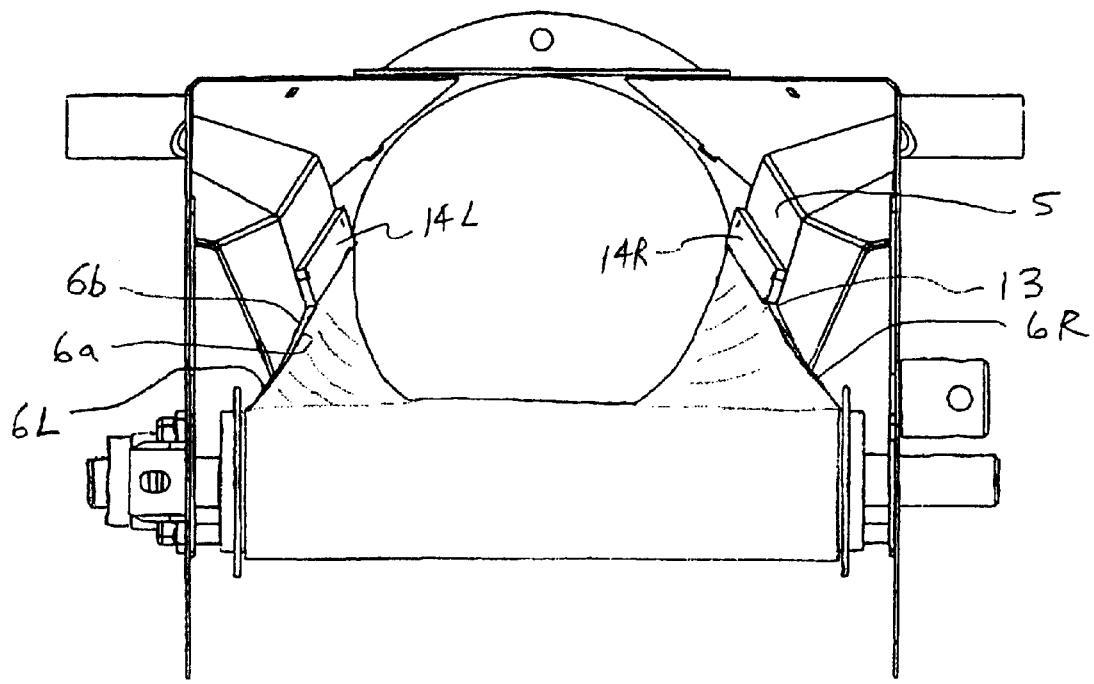
FIG. 4 is an end view of the belt conveyor of FIG. 3 with the belt added.
Figure 5:
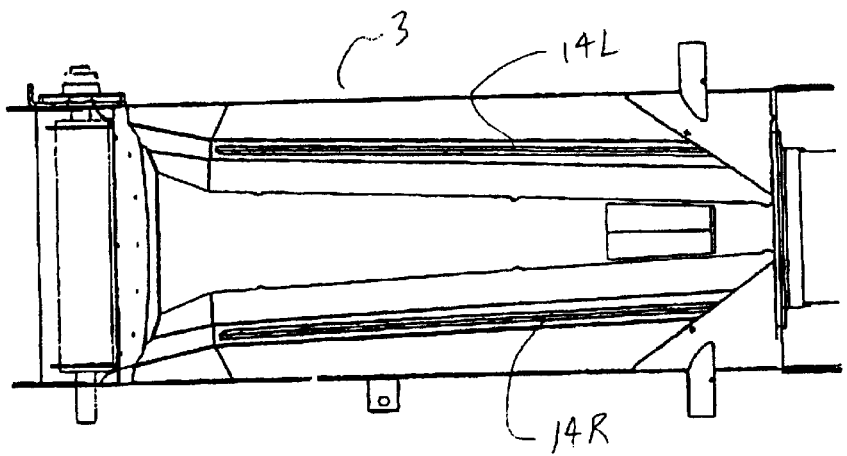
FIG. 5 is a top view of the belt conveyor of FIG. 1 with the belt and hopper end wall removed.
Figure 6:
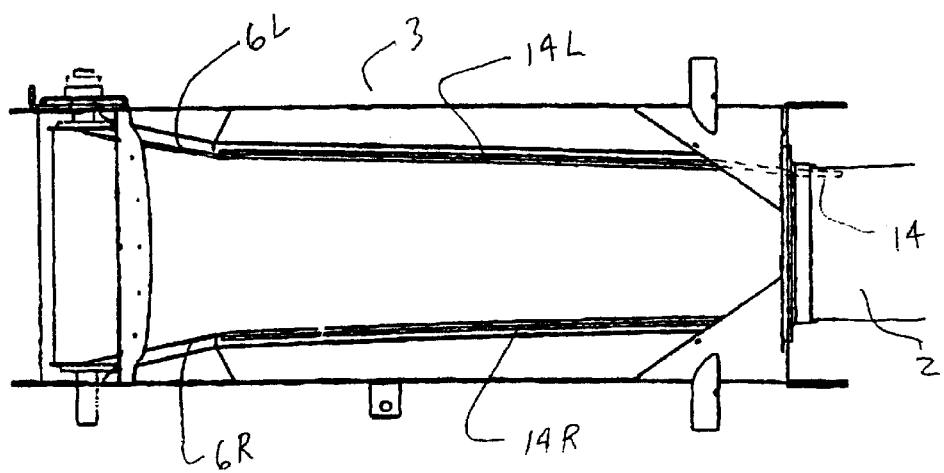
FIG. 6 is a top view of the belt conveyor of FIG. 5 with the belt added.
Figure 7:
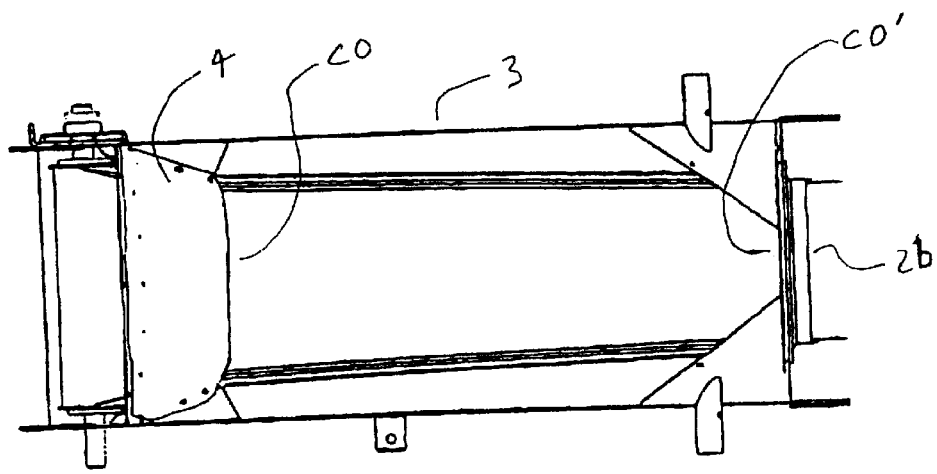
FIG. 7 is a top view of the belt conveyor of FIG. 6 with the hopper end wall added.
Figure 8:
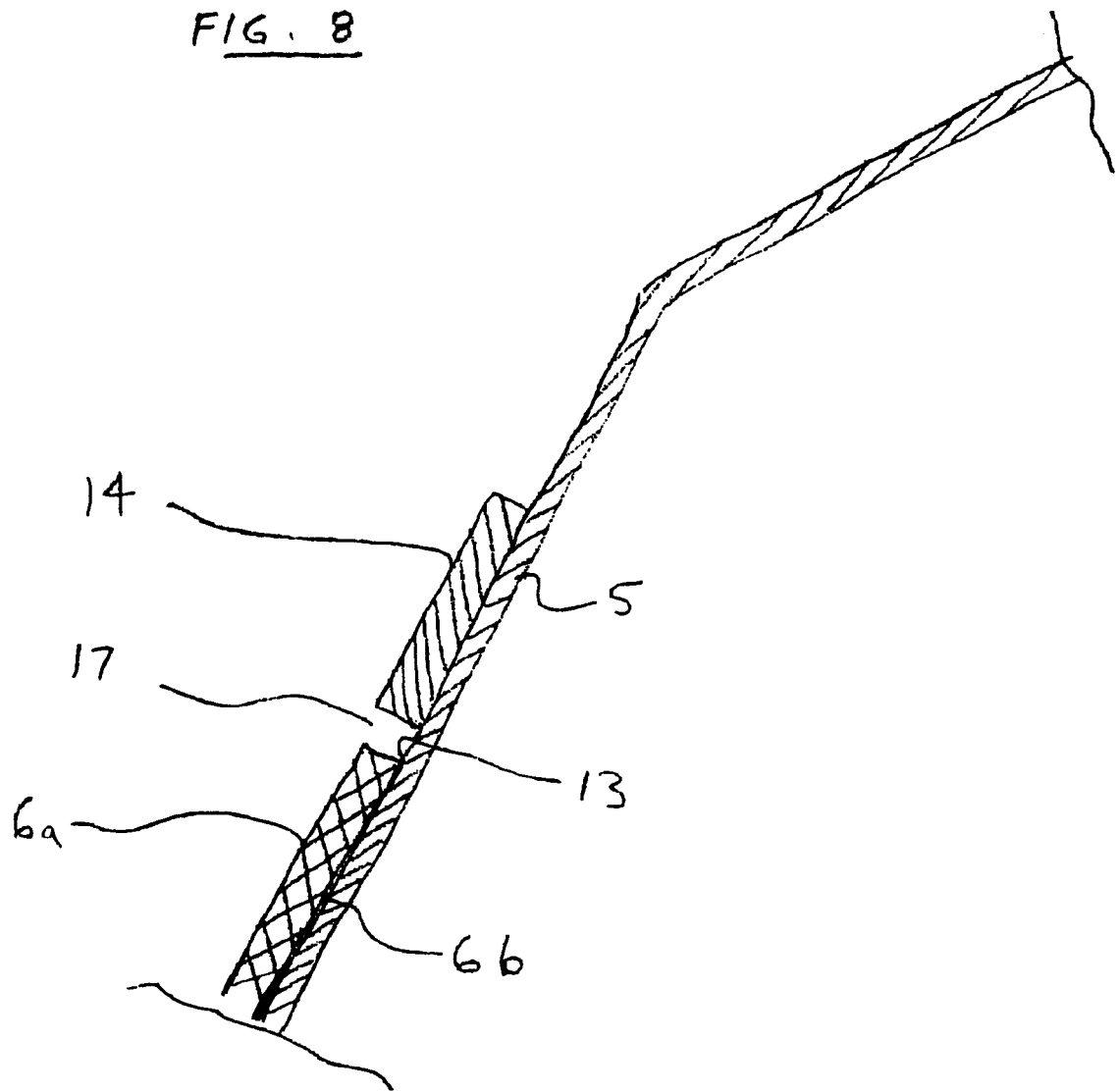
FIG. 8 is a cross-section view along 8—8 in FIG. 1.

Similarly FIGS. 3 and 4 illustrate end views with and without the belt 6 in place. Similarly again FIG. 5 illustrates a top view without the belt 6 or end wall 4. FIG. 6 adds the belt and FIG. 7 adds the end wall 4.

The belt 6 has an upper surface 6a and a lower surface 6b. The belt 6 runs along an upper path 7 extending from a lower roller 8, then under the end wall 4 and end wall support bracket 16 through the bottom of the hopper 3, then through the tube 2 to an upper roller 9, and then along a lower path 10 from the upper roller 9 to the lower roller 8. A drive 11 is incorporated in the lower path 10 to move the belt 6 along the upper path 7 from the input end 2b toward the output end 2a of the tube 2. The drive 11 is conventional and is not further illustrated.

Guide members 12 at a lower end of the conveyor 1 are angled inward and upward from the outer ends of the lower roller 8 to guide the belt 6 from a flat orientation FO as the belt leaves the lower roller 8 into a cupped orientation CO as the belt 6 enters the hopper 3.

The cupped orientation CO is maintained by sliding contact at an interface 13 between the lower surface 6b of the belt 6 and the hopper walls 5 as the belt 6 passes through the hopper 3. In the illustrated embodiment the hopper side walls 5 converge as they approach the input end 2b of the tube 2 guiding the belt from a first cupped orientation CO at the hopper end wall 4 to a second cupped orientation CO' at the tube 2. The belt 6 thus has left and right edges 6L, 6R thereof closer to each other in the second cupped orientation CO' than in the first cupped orientation CO.

Figure 9:
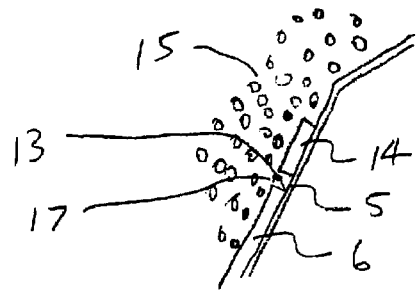
FIG. 9 is a schematic of FIG. 8 showing granular material in the hopper.
Figure 10:
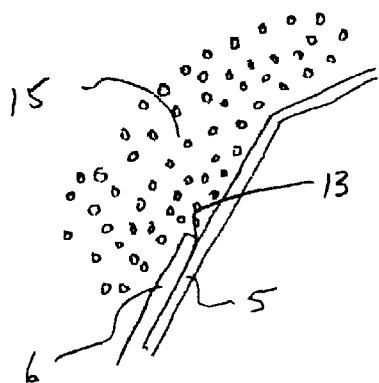
FIG. 10 illustrates the view of FIG. 9 with the baffle member removed illustrating granular material sliding down the hopper wall so as to exert pressure on the interface between the belt and hopper wall.

Left and right baffle members 14L, 14R are attached along the hopper side walls 5 from the end wall 4 substantially to the tube 2 in proximity to left and right edges 6L, 6R of the belt 6. The baffle members 14 extend from the hopper walls 5, as illustrated in FIG. 9, and thereby prevent the granular material 15 from sliding down the hopper walls 5 as illustrated in FIG. 10 into contact with the interface 13 between the lower surface of the belt 6b and the hopper walls 5. Granular material 15 is thus prevented from exerting any appreciable pressure on the interface 13 and working its way under the belt 6. The gap 17 between the baffle member 14 and the edge 6L, 6R of the belt 6 can be such that some particles of granular material 15 can enter the gap 17 and come into contact with the interface 13, however the baffle members 14 ensure that no appreciable pressure can be applied to the interface 13 by the granular material 15. The illustrated baffle members 14 extend from the hopper walls 5 approximately to the upper surface 6a of the belt 6.

The belt 6 thus has a width that is substantially fully exposed to granular material 15 entering the hopper 3, with the result that the full width of the belt 6 is exposed to the granular material 15 and is available to exert a force on the granular material 15 and move same up the tube 2 and the conveyor capacity is increased.

FIG. 6 illustrates an embodiment where a baffle member 14 extends partially into the tube 2.

With the guide members 12 oriented as illustrated, the lower roller may be located very close to the end wall 4 of the hopper 3. The distance from the center of the lower roller 8 to the hopper end wall 4 can be reduced to between nine and twelve inches. The conventional lower roller 8 is located a greater distance from the end wall 4, and can interfere with the access to the hopper 3 by trucks and the like.

Figure 11:
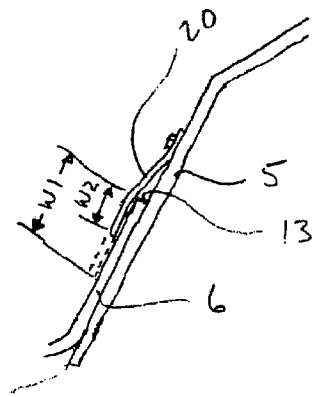
FIG. 11 illustrates the view of FIG. 10 with a conventional flashing covering a portion of the belt.

A conventional flashing 20 is illustrated in FIG. 11 mounted on a hopper wall 5 such as that illustrated above. The flashing 20 extends from the hopper wall 5 over a portion of each side of the belt 6 to prevent granular material 15 from moving under the belt 6. The capacity of the conveyor can be increased by reducing the width W1 of the flashing 20 to a lesser width W2 such that a greater width of the belt 6 is exposed to granular material 15 entering the hopper 3.

In the embodiments of the invention illustrated in FIGS. 1–7, the width is reduced to zero such that the total width of the belt 6 is exposed to granular material entering the hopper, and granular material 15 is substantially prevented from moving under the belt 6 by preventing the granular material 15 from sliding down the hopper walls 5 into contact with the interface 13 between the lower surface 6b of the belt 6 and the hopper wall 5.

The apparatus and method described provide a substantial improvement in conveyor capacity in a simple and cost effective manner.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A belt conveyor for conveying granular material comprising:
    a tube having an upper output end and a lower input end;
    a hopper for receiving granular material attached at the input end of the tube, the hopper including a hopper end wall and hopper side walls extending from the end wall to the input end of the tube;
    a belt having an upper surface and a lower surface, and having an upper path extending from a lower roller, then through a bottom of the hopper, then through the tube to an upper roller; and a lower path from the upper roller to the lower roller;
    a drive to move the belt along the upper path from the input end toward the output end of the tube;
    guide members at a lower end of the conveyor for guiding the belt from a flat orientation as the belt leaves the lower roller into a cupped orientation as the belt enters the hopper, the cupped orientation maintained by sliding contact at an interface between the lower surface of the belt and the hopper walls as the belt passes through the hopper;
    left and right baffle members attached along the hopper side walls from the end wall substantially to the tube in proximity to left and right edges of the belt, the baffle members extending from the hopper wall and thereby preventing the granular material from sliding down the hopper walls into contact with the interface between the lower surface of the belt and the hopper walls;
    wherein the belt has a width that is substantially fully exposed to granular material entering the hopper.

2. The apparatus of claim 1 wherein the baffle members extend from the hopper wall approximately to the upper surface of the belt.

3. The apparatus of claim 1 wherein at least one baffle member extends partially into the tube.

4. The apparatus of claim 1 wherein the hopper side walls guide the belt from a first cupped orientation at the hopper end wall to a second cupped orientation at the tube, the belt having the left and right edges thereof closer to each other in the second cupped orientation than in the first cupped orientation.

5. The apparatus of claim 4 wherein a distance from a center of the lower roller to the hopper end wall is less than twelve inches.

6. The apparatus of claim 5 wherein the distance from the center of the lower roller to the hopper end wall is less than nine inches.

7. A method of increasing the capacity of a belt conveyor of the type having a cupped belt running through a hopper with a width of flashing extending from hopper walls over a portion of each side of the belt to prevent granular material from moving under the belt, the method comprising reducing the width of the flashing to zero such that a total width of the belt is exposed to granular material entering the hopper, and substantially preventing granular material from moving under the belt by attaching a baffle member to the hopper wall in proximity to each edge of the belt to prevent the granular material from sliding down the hopper walls into contact with an interface between the lower surface of the belt and the hopper walls.

* * * * *